United States Patent
Lim et al.

(10) Patent No.: US 12,002,310 B2
(45) Date of Patent: Jun. 4, 2024

(54) METHOD OF SELECTING ACCIDENT IMAGE BASED ON SPEED PROFILE ANALYSIS

(71) Applicant: AIMATICS CO., LTD., Seoul (KR)

(72) Inventors: Sang Mook Lim, Seoul (KR); Jin Hyuck Kim, Seoul (KR)

(73) Assignee: AIMATICS CO., LTD., Seoul (KR)

( * ) Notice: Subject to any disclaimer, the term of this patent is extended or adjusted under 35 U.S.C. 154(b) by 315 days.

(21) Appl. No.: 17/636,656

(22) PCT Filed: Dec. 29, 2021

(86) PCT No.: PCT/KR2021/020113
§ 371 (c)(1),
(2) Date: Feb. 18, 2022

(87) PCT Pub. No.: WO2022/146008
PCT Pub. Date: Jul. 7, 2022

(65) Prior Publication Data
US 2023/0162543 A1    May 25, 2023

(30) Foreign Application Priority Data
Dec. 30, 2020  (KR) .......................... 10-2020-0187526

(51) Int. Cl.
*G07C 5/08*  (2006.01)
*G07C 5/00*  (2006.01)

(52) U.S. Cl.
CPC ............. *G07C 5/085* (2013.01); *G07C 5/008* (2013.01); *G07C 5/0808* (2013.01)

(58) Field of Classification Search
CPC ....... G07C 5/085; G07C 5/008; G07C 5/0808
See application file for complete search history.

(56) References Cited

U.S. PATENT DOCUMENTS

2016/0275790 A1* 9/2016 Kang ................. G08G 1/09675

FOREIGN PATENT DOCUMENTS

KR    1020130101821 A    9/2013

OTHER PUBLICATIONS

English Translation of KR 20150121529 A Author: Back Chang Hyun Title: Method for Recording Event video by impact detecting in vehicle black box and system thereof Date: Oct. 29, 2015 (Year: 2015).*
English Translation of JP6647650B1 Author: Kutsuzawa Kazuaki Title: Recording Device, Recording Method and Program Date: Feb. 14, 2020 (Year: 2020).*

* cited by examiner

*Primary Examiner* — James J Lee
*Assistant Examiner* — Steven Vu Nguyen
(74) *Attorney, Agent, or Firm* — You & IP, LLC

(57) ABSTRACT

The present disclosure relates to a method of selecting an accident image by using speed profile analysis, which can sufficiently secure an available capacity of a storage medium, can reduce the amount of transmission data and a fee therefor, and can prevent a loss of unnecessary management expenses, by selecting an actual accident image by using speed profile analysis before and after the occurrence of an impact event and deleting, from the storage medium, an image having a grade determined to have a low accident possibility or changing a state of the image into an overwritable state or taking measures for preventing the transmission of the image to a cloud server.

8 Claims, 5 Drawing Sheets

METHOD OF SELECTING ACCIDENT IMAGE BASED ON SPEED PROFILE ANALYSIS

TECHNICAL FIELD

The present disclosure relates to a method of selecting an accident image by using speed profile analysis, which can sufficiently secure an available capacity of a storage medium, can reduce the amount of transmission data and a fee therefor, and can prevent a loss of unnecessary management expenses, by selecting an actual accident image by using speed profile analysis before and after the occurrence of an impact event and deleting, from the storage medium, an image having a grade determined to have a low accident possibility or changing a state of the image into an overwritable state or taking measures for preventing the transmission of the image to a cloud server.

BACKGROUND ART

In general, a blackbox installed in a vehicle detects an impact applied to the vehicle and stores an image before and after the detection of the impact. In general, such an accident image is permanently preserved until the accident image is forcedly deleted by a user. A region in which the accident image is stored is a region in which the accident image is prohibited from being overwritten with a new image.

A cloud control system in which vehicles for business, such as trucks, buses, and taxes, are managed by a remote server is recently being introduced. In the cloud control system, a communication terminal installed in a vehicle transmits, to a control server, an image before and after the occurrence of an impact event immediately, periodically, or upon request from the server. Furthermore, the communication terminal installed in the vehicle transmits an accident image to a communication server, such as a police station, a fire station, or a road corporation, over a wideband communication network, which makes it possible to handle an urgent situation and contribute to reducing a loss of life in a big accident.

The blackbox stores an image whenever an impact greater than impact detection sensitivity occurs. A big accident in which a vehicle is greatly damaged or life damage occurs must be naturally recorded on the blackbox. However, a simple minor collision also needs to be recorded on the blackbox in order to reveal attributable reasons for the accident and in an economic aspect in which compensation for the loss needs to be considered. Accordingly, in most of blackboxes so far, impact detection sensitivity is set as a very low level.

Several tradeoffs occur because impact detection sensitivity of the blackbox is set as a low level. A storage medium (such as a NAND flash memory or an SD card) within the blackbox has a limited permanently preserved storage region because the storage medium has a limited capacity. Furthermore, in general, storage media have a problem in that lifespan thereof is reduced as a region on which a new image will be recorded is reduced because the storage media have limited lifespan for the number of pieces of writing. The greatest problem is that a lot of loss of time and economy is caused in identifying an image of a fake accident (not an actual accident), transmitting an image over a communication network, selecting, by a manager, an image, etc.

Accordingly, in order to reduce a loss consumed to select an accident image, a blackbox needs to autonomously filter out an image not corresponding to an accident, delete the image or storing the image in an overwritable region, and permanently preserve only an actual accident image or transmit the actual accident image to a control server.

In Korean Patent Application Publication No. 10-2013-0101821 entitled "BLACKBOX CHANGING SENSITIVITY OF SHOCK DETECTION ACCORIDNG TO VEHICLE SPEED, AND CONTROL METHOD THEREOF", an impact occurrence determination reference value is determined to be high based on a driving speed of a vehicle, and an image captured by a camera is permanently stored for a given time interval including timing at which an impact is determined to have occurred.

However, an actual vehicle accident frequently occurs even in low-speed driving. For example, an accident in which a vehicle that starts after stopping at a crossroad collides with a pedestrian who jaywalks or rear-ends a vehicle ahead frequently occurs. In this case, it is highly likely that the vehicle has traveled at a very low speed. In the Prior Document, such an accident may be erroneously determined to be not an impact because an impact occurrence determination reference value at a low speed is low. If an image of the accident is deleted without being stored in the blackbox, it may be difficult to reveal who is attributable to the accident. If the image of the accident is not transmitted to a cloud control server that manages a plurality of vehicles at a proper time, rapid and efficient management for the vehicles will fail. Such problems may instead increase a loss cost.

DISCLOSURE

Technical Problem

An object of the present disclosure is to provide a method of selecting an accident image by using speed profile analysis, which can significantly reduce a loss cost consumed to select an accident image by analyzing a speed profile before and after the occurrence of an impact event, determining the impact event as a high accident possibility when it is considered that a vehicle has stopped for a given time in a specific interval before and after the impact event, and preserving a corresponding impact detection image as an accident image, and if not, determining the impact event as a low accident possibility and deleting the corresponding impact detection image or moving the corresponding impact detection image to an overwritable region.

Furthermore, an object of the present disclosure is to provide a method of selecting an accident image based on speed profile analysis, which can determine an accident grade by comparing a deceleration ratio in a specific interval before and after the occurrence of an impact event with a predetermined accident deceleration ratio (ADR) and safe deceleration ratio (SDR) and can take proper measures against a corresponding impact detection image depending on whether the accident grade is high or low.

Technical Solution

A method of selecting an accident based on speed profile analysis and is a method of detecting, by a blackbox installed in a vehicle, an impact applied to the vehicle, storing an image before and after impact detection timing T0 as an impact detection image, and then determining whether the impact detection image is an accident image includes steps of (a) determining whether a driving speed of the vehicle maintains a reference speed $V_{TH}$ or less for a given time in a section between first timing T1 before the impact detection timing T0 and second timing T2 after the impact detection timing T0, (b) determining the impact detection image as an image having a low accident possibility when the driving speed is determined to be greater than the reference speed $V_{TH}$ in the step (a), and (c) determining the impact detection image as an image having a high accident possibility when the driving speed is determined to be equal to or smaller than the reference speed $V_{TH}$ in the step (a).

Advantageous Effects

According to the method of selecting an accident image based on speed profile analysis according to the present disclosure, there are effects in that even a vehicle accident image at a low speed can be accurately selected as an actual accident image because an accident possibility of an impact detection image is determined by analyzing a speed profile before and after the occurrence of an impact event without a need for a blackbox for a vehicle to adjust impact detection sensitivity and a loss cost consumed to select an accident image can be significantly reduced because an impact detection image determined to have a low accident possibility is deleted or moved to an overwritable region.

Furthermore, according to an embodiment of the present disclosure, there is an effect in that an impact detection image can be efficiently managed because an accident grade can be determined by comparing a deceleration ratio in a specific interval before and after the occurrence of an impact event with a predetermined accident deceleration ratio (ADR) and safe deceleration ratio (SDR), and proper measures can be taken against a corresponding impact detection image depending on whether the accident grade is high or low.

BEST MODE

Figure 1:
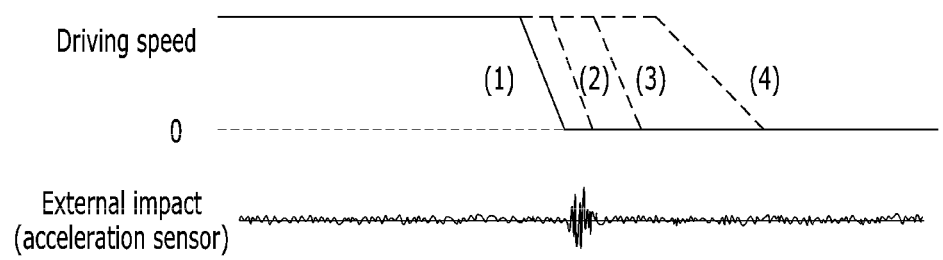
FIG. 1 is a speed change graph illustrating an example of a speed profile when an impact event occurs in an actual accident situation.

Hereinafter, detailed embodiments according to the present disclosure are described with reference to the accompanying drawings. It is however to be understood that the present disclosure is not intended to be limited to the specific embodiments and includes all changes, equivalents and substitutions which fall within the spirit and technical scope of the present disclosure.

The same reference numeral is assigned to a portion having a similar element and operation throughout the specification. Furthermore, the accompanying drawings of the present disclosure are for convenience of description, and shapes and relative criteria thereof may be exaggerated or omitted.

In specifically describing the embodiments, a redundant description or a description of a technique evident in a corresponding field has been omitted. Furthermore, in the following description, when it is said that one element "includes" the other element, the word "include" means that the one element may further include an element other than the describe element unless explicitly described to the contrary.

Furthermore, a term, such as " . . . unit", " . . . er (or . . . or)", or " . . . module" described in the specification, means a unit for processing at least one function or operation, and this may be implemented by hardware or software or a combination thereof. Furthermore, when it is described that one part is electrically connected to another part, it should be understood that the two parts may be directly connected to each other, or may be connected to each other with a third part interposed therebetween.

Terms, such as a "first" and a "second", may be used to describe various elements, but the elements are not limited by the terms. The terms are used to only distinguish one element from the other element. For example, a first element may be named a second element without departing from the scope of a right of the present disclosure. Likewise, a second element may be named a first element.

The present disclosure relates to a method of selecting an accident image based on speed profile analysis, which determines whether an impact detection image stored due to an impact event is an actual accident image by analyzing a speed profile before and after the occurrence of the impact event. The method of selecting an accident image according to the present disclosure may be an algorithm performed by a blackbox for a vehicle, and may be a processing routine executed after an impact event occurs and an impact detection image is stored in response to the impact event. The method of selecting an accident image according to the present disclosure may be a computer-readable program stored in a read-only storage device (e.g., such as a ROM) within a blackbox, and may be a processing routine invoked and executed by a processor. In the method of selecting an accident image according to the present disclosure, a blackbox does not change a collision detection reference value for detecting a collision against a vehicle. In the method of selecting an accident image according to the present disclosure, an impact detection image is stored, and then it is only determined whether the corresponding image is an actual accident image or a fake accident image, but an image selected as a fake accident after the image is selected may be deleted or moved to an overwritable region. The image selected as an actual accident may be permanently preserved in a storage medium or may be immediately or periodically transmitted to a remote control server. Prior to a detailed description of an embodiment of the present disclosure, a process of setting reference values for analyzing a speed profile and a process of setting a sampling section for analyzing a speed profile in the present disclosure are described with reference to FIGS. 1 to 5.

FIG. 1 is a speed change graph illustrating an example of a speed profile when an impact event occurs in an actual accident situation.

Referring to FIG. 1, a blackbox for a vehicle determines whether an impact event has occurred in response to an impact detection signal received through an impact detection sensor (e.g., an acceleration sensor) or a car area network (CAN) included the blackbox. The blackbox may determine that an impact event has occurred in a section in which amplitude of a signal is increased at the bottom of the graph of FIG. 1.

If the impact event is an actual accident situation and a vehicle driver has recognized an accident possibility prior to the collision, it is highly likely that the vehicle will be suddenly decelerated prior to the impact event and will be completely stopped as in (1) illustrated as a solid line in the driving speed graph of FIG. 1. That is, the driving speed graph shown in (1) of FIG. 1 indicates an accident situation in which it is highly likely that the vehicle has actually collided against a moving object.

In (2) and (3) of FIG. 1, a sudden deceleration section is formed over timing at which the impact event occurred. This indicates a situation in which it is highly likely that a vehicle driver has checked a collision target late and pressed a brake pedal. For example, a speed profile shown in (2) and (3) of FIG. 1 is obtained in an accident in which a vehicle collided against a stationary object or collided against a moving object that suddenly appeared.

(4) of FIG. 1 illustrates sudden deceleration of the vehicle after the impact event occurred. This indicates a situation in which it is highly likely that a vehicle driver pressed a brake pedal after a collision without recognizing the collision against an object. For example, a speed profile shown in (4) of FIG. 1 is obtained in a situation in which a rear-end accident occurred due to a vehicle behind or a vehicle stopped for handling a collision accident in a situation in which a driver had not recognized the collision.

Common points in the speed profiles shown in (1) to (4) of FIG. 1 are that the driving speed of the vehicle has dropped to zero close to a stop at close timing before and after the occurrence of the impact event and the driving speed has suddenly decelerated.

Figure 2:
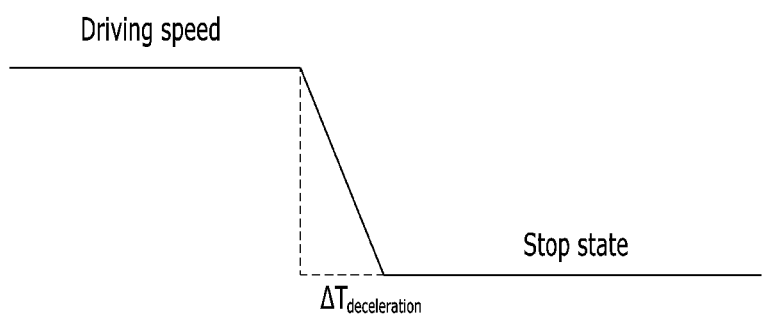
FIG. 2 is a diagram illustrating an example in which an accident deceleration ratio (ADR) is set through the analysis of the speed profile in FIG. 1.

A deceleration ratio during the time ($\Delta T_{deceleration}$) from timing at which deceleration occurs to timing at which the deceleration ends may be calculated as in FIG. 2. An accident deceleration ratio (ADR) capable of estimating an actual accident during the time before and after the occurrence of an impact event may be estimated by obtaining an average of deceleration ratios by taking the examples of (1) to (4) of FIG. 1 altogether. The present disclosure includes a process of determining whether an impact detection image is an actual accident image by determining deceleration ratios before and after an impact event by comparing the deceleration ratios with a predefined ADR.

Figure 3:
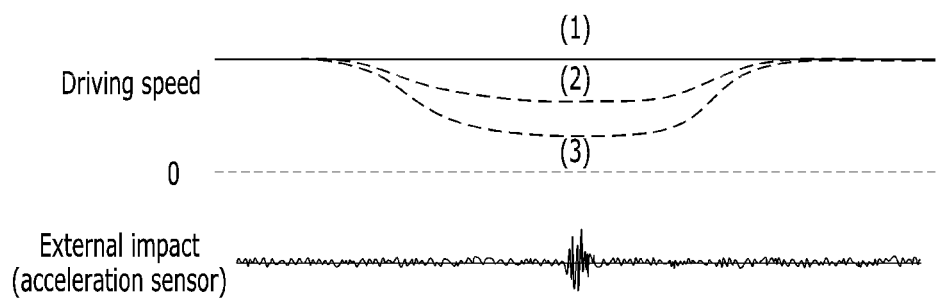
FIG. 3 is a speed change graph illustrating an example of a speed profile when an impact event occurs due to an obstacle impact, not an accident.
Figure 4:
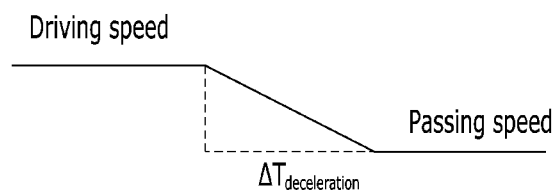
FIG. 4 is a diagram illustrating an example in which a safe deceleration ratio (SDR) is set through the analysis of the speed profile in FIG. 3.

FIG. 3 is a speed change graph illustrating an example of a speed profile when an impact event occurs due to an obstacle impact, not an accident, and illustrates a speed change when a vehicle is collided with an obstacle (such as a speed bump, a pothole, or a fallen object) on a road.

As described in the Background, a blackbox generates an impact event even in a small impact occurring when a vehicle passes an obstacle on a road. For example, there may be a case where a driver passes a speed bump without deceleration as in (1) of FIG. 3 without recognizing a speed bump. (2) of FIG. 3 corresponds to a speed profile for a situation in which a driver recognized an obstacle, but expects that an impact will not be great, and passes the speed bump by slightly decelerating the speed. (3) of FIG. 3 corresponds to a situation in which a vehicle passes a high speed bump installed in a school zone, and corresponds to a speed profile for a situation in which a driver passes an obstacle at low speed.

The situations (1) to (3) of FIG. 3 are situations in which deceleration was performed before and after the impact event, but sufficient deceleration to stop the vehicle was not performed. As in FIG. 4, a deceleration ratio during the time ($\Delta T_{deceleration}$) from timing at which deceleration occurs to timing at which the deceleration ends will appear as a very gentle slope compared to FIG. 2. A safe deceleration ratio (SDR) in a state not an actual accident during the time before and after the occurrence of an impact event may be estimated by obtaining an average of deceleration ratios by taking the examples of (1) to (3) of FIG. 3 altogether. The SDR will be set as a very lower value than the ADR. The present disclosure includes a process of determining whether an impact detection image is a fake accident (not required to store and process the impact detection image as an accident image) by determining deceleration ratios before and after an impact event by comparing the deceleration ratio with a predefined SDR.

Figure 5:
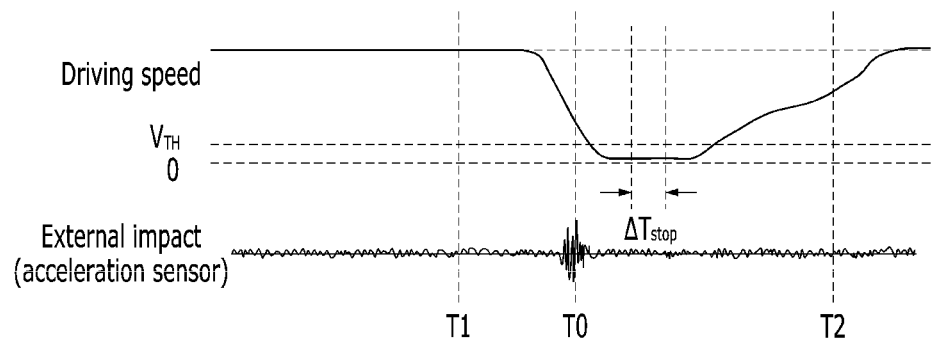
FIG. 5 is a graph illustrating an example in which a speed profile analysis section is set in the present disclosure.

FIG. 5 is a graph illustrating an example in which a speed profile analysis section is set in the present disclosure. As described with reference to FIGS. 1 and 2, whether a stop (or slow driving at a very low speed to the extent close to a stop) before and after an impact event was performed acts as a very important factor in determining whether the stop is an actual accident situation. Furthermore, if a deceleration ratio before and after timing at which an impact event occurred was greater than the ADR described with reference to FIG. 2, it may be estimated that it is highly likely that an accident occurred. If a deceleration ratio before and after timing at which an impact event occurred was less than the SDR described with reference to FIG. 4, it may be estimated that such a situation is highly likely to be not an actual accident but a fake accident situation in which a vehicle went over a speed bump or passed a pothole. Moreover, whether a section in which sudden deceleration occurred is located before impact detection timing T0, before and after T0 while overlapping T0, or after T0 may also be used as a criterion for determining an actual accident possibility.

In a method of selecting an accident image according to the present disclosure, a blackbox sets first timing T1 before T0 and second timing T2 after T0 on the basis of timing at which an impact event occurs (hereinafter referred to as impact detection timing T0). An optimal section for the section T1 to T2 in which a speed profile is analyzed may be found and set through the analysis of data in FIGS. 1 and 3, but each of the timings T1 and T2 has only to be close to T0.

Next, a reference speed $V_{TH}$ at which it may be considered that a vehicle stopped is set. The reference speed $V_{TH}$ may be determined in the range of approximately 0 to 5 km/h, and is preferably set to zero. Next, a reference $\Delta T_{stop}$ for a stop time when it may be considered that a vehicle stopped is set. For example, if a stop state is maintained for five seconds in the section (T1, T2) before and after the impact detection timing T0, it is highly likely that an actual collision accident has occurred. The reference $\Delta T_{stop}$ for the stop time may be set in the range of approximately three seconds to ten seconds. A method of selecting an accident image based on speed profile analysis according to the present disclosure is described as follows with reference to FIGS. 6 to 9.

Figure 6:
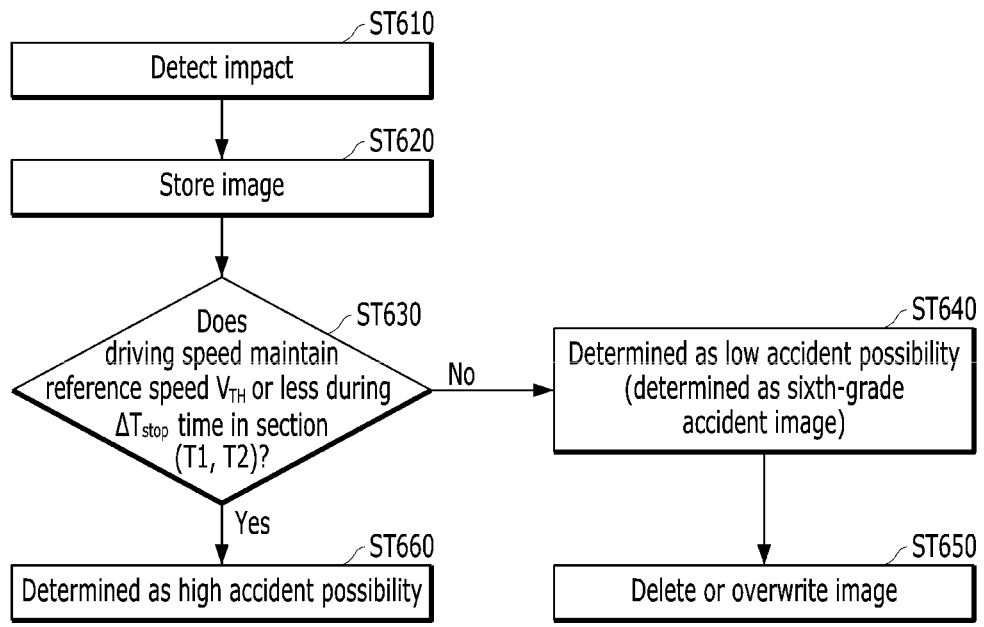
FIG. 6 is a flowchart illustrating a basic flow of a method of selecting an accident image based on speed profile analysis according to the present disclosure.
Figure 7:
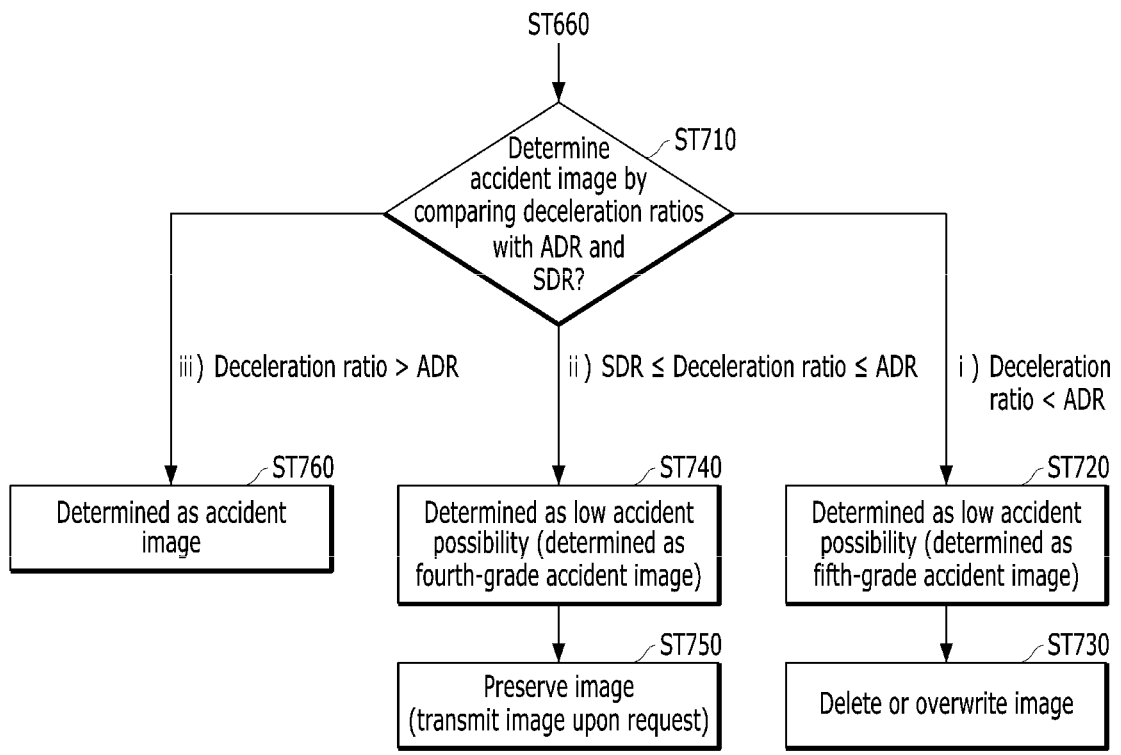
FIG. 7 is a flowchart illustrating a process of determining a deceleration ratio by comparing the deceleration ratio with the ADR and the SDR in the present disclosure.
Figure 8:
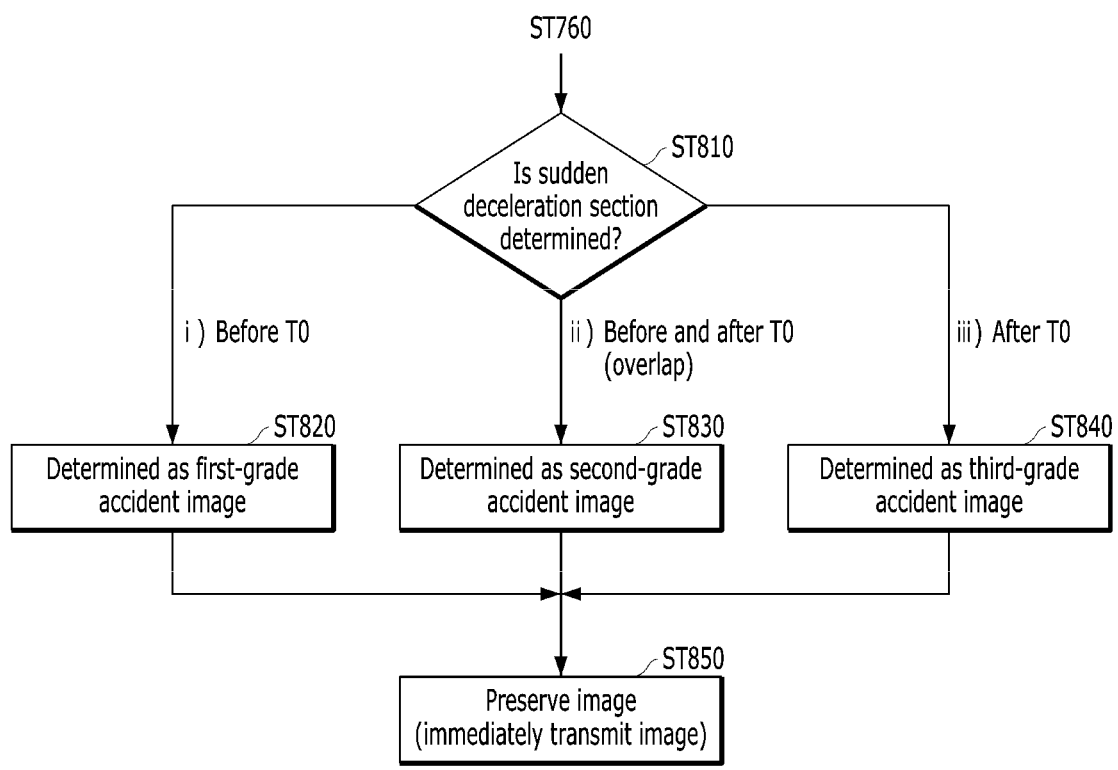
FIG. 8 is a flowchart illustrating a process of determining an accident grade of an image by determining sudden deceleration timing in the present disclosure.
Figure 9:
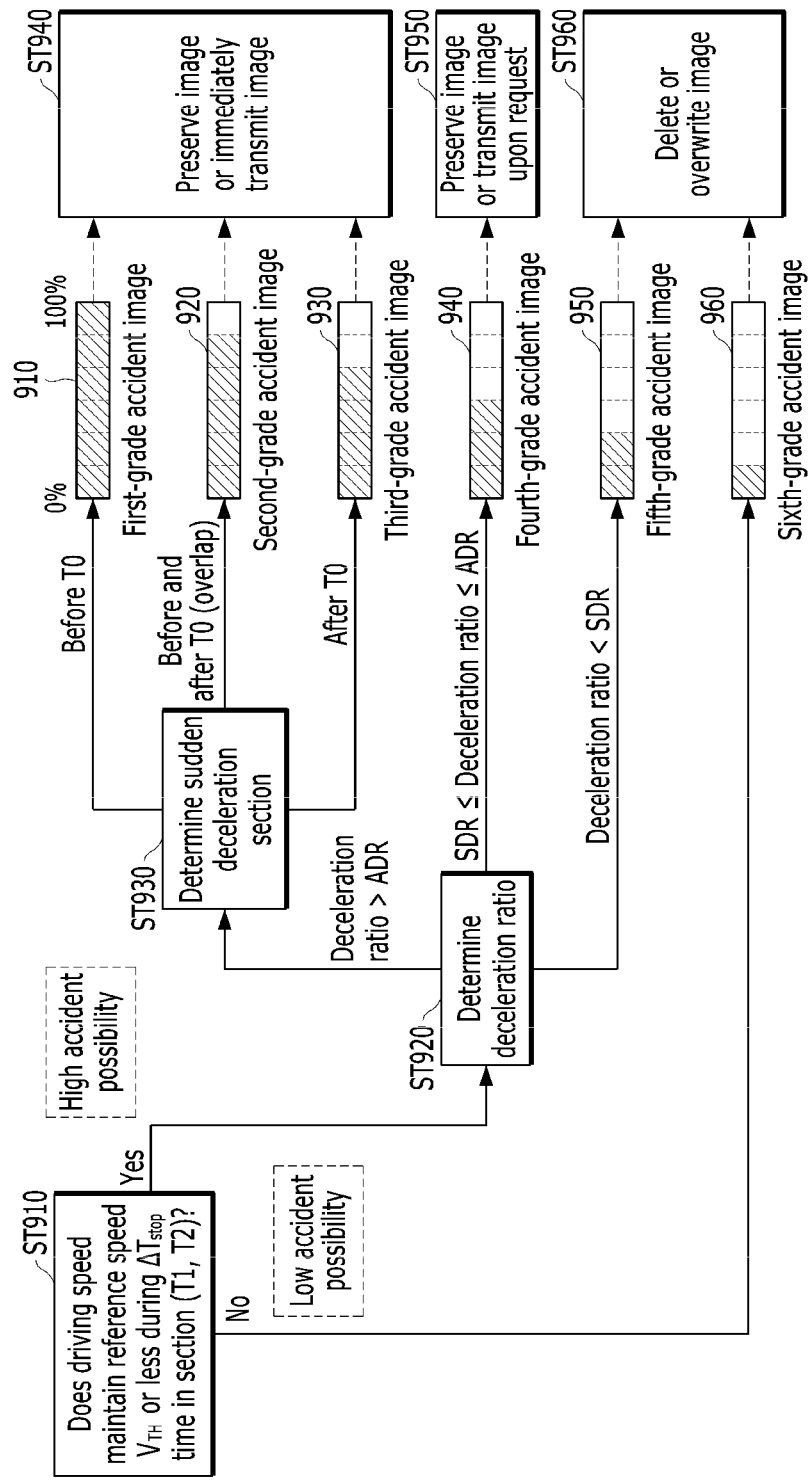
FIG. 9 is a diagram conceptually depicting the entire flow of a method of selecting an accident image based on speed profile analysis according to the present disclosure.

FIG. 6 is a flowchart illustrating a basic flow of a method of selecting an accident image based on speed profile analysis according to the present disclosure. FIG. 7 is a flowchart illustrating a process of determining a deceleration ratio by comparing the deceleration ratio with the ADR and the SDR in the present disclosure. FIG. 8 is a flowchart illustrating a process of determining an accident grade of an image by determining sudden deceleration timing in the present disclosure. FIG. 9 is a diagram conceptually depicting the entire flow of a method of selecting an accident image based on speed profile analysis according to the present disclosure.

Referring to FIG. 6, the method starts with a step in which a blackbox detects an impact (ST610). The blackbox stores an image before and after impact detection timing T0 as an impact detection image (ST620). The impact detection image may be a moving image, and may be images in which a plurality of still images is combined.

Next, the blackbox determines whether a driving speed of a vehicle maintains a reference speed $V_{TH}$ or less during a reference $\Delta T_{stop}$ for a stop time in a section (T1, T2) (ST630). In this case, the reference speed $V_{TH}$ may be set as zero or a value close to zero or may be set as 5 km/h or less.

When the determination result of step ST630 is "No", the blackbox determines the corresponding impact detection image as an image having a low accident possibility (ST640). In the present embodiment, the impact detection image in step ST640 is determined as a sixth-grade accident image having the lowest accident possibility. Next, the blackbox deletes the sixth-grade accident image from a storage medium of the blackbox or moves the sixth-grade accident image to an overwritable region (ST650).

When the determination result of step ST630 is "Yes", the blackbox determines the corresponding impact detection image as an image having a high accident possibility (ST660).

Referring to FIG. 7, the blackbox detects a deceleration ratio of the vehicle in the section (T1, T2) after step ST660, and may determine whether the detected deceleration ratio is i) less than a predetermined SDR, ii) equal to or greater than the SDR and is equal to or smaller than an ADR predetermined as a value greater than the SDR, or iii) greater than the ADR (ST710).

When the deceleration ratio in the section (T1, T2) is determined to be i) less than the SDR in step ST710, the blackbox re-determines the corresponding impact detection image as an image having a low accident possibility (ST720). In step ST720, the impact detection image is determined as a fifth-grade accident image indicative of a higher accident possibility than the sixth-grade accident image. Next, the blackbox deletes the fifth-grade accident image from the storage medium of the blackbox or moves the fifth-grade accident image to an overwritable region (ST730).

When the deceleration ratio in the section (T1, T2) is determined to be equal to or greater than the SDR and to be equal to or smaller than the ADR in step ST710, the blackbox also re-determines the corresponding impact detection image as an image having a low accident possibility (ST740). In this case, in step ST740, the impact detection image is determined as a fourth-grade accident image indicative of a higher accident possibility than the fifth-grade accident image. Subsequently, unlike the fifth-grade accident image, the blackbox temporarily preserves the fourth-grade accident image in the storage medium of the blackbox (ST750). The temporarily preserved fourth-grade accident image may be transmitted over a wireless communication network only when a remote control server requests the fourth-grade accident image. Furthermore, for example, the temporarily preserved fourth-grade accident image may be moved to the overwritable region.

When the deceleration ratio in the section (T1, T2) is determined to be greater than the ADR in step ST710, the blackbox determines the corresponding impact detection image as an accident image (ST760).

Referring to FIG. 8, subsequently to step ST760, the blackbox may select a sudden deceleration section, in which the vehicle has been decelerated most suddenly, among a plurality of division sections obtained by equally dividing the section (T1, T2), and may determine whether the sudden deceleration section is located i) before the impact detection timing T0, ii) before and after the impact detection timing T0 while overlapping the impact detection timing T0, or iii) after the impact detection timing T0 (ST810).

If the determination result of step ST810 indicates that the sudden deceleration section is located i) before the impact detection timing T0, the blackbox determines the corresponding impact detection image as a first-grade accident image indicative of the highest accident possibility (ST820). As described with reference to the speed profile of FIG. 1, this means that the accident is highly likely to be an actual collision accident because a driver has recognized a collision situation before a collision against a moving object and has performed sudden deceleration.

If the determination result of step ST810 indicates that the sudden deceleration section is located ii) before and after the impact detection timing T0 while overlapping the impact detection timing T0, the blackbox determines the corresponding impact detection image as a second-grade accident image indicative of a lower accident possibility than the first-grade accident image (ST830). The reason for this is that it is highly likely that a driver has collided against a stationary object or a moving object that suddenly appears, as described with reference to the speed profile of FIG. 1.

If the determination result of step ST810 indicates that the sudden deceleration section is located iii) after the impact detection timing T0, the blackbox determines the corresponding impact detection image as a third-grade accident image indicative of a lower accident possibility than the second-grade accident image (ST840). As described with reference to the speed profile of FIG. 1, the accident may be determined as an actual accident with a relatively high probability because this is an example in which the vehicle of a driver was rear-ended by another vehicle behind and was suddenly decelerated after the rear end or it is highly likely that the driver stopped the vehicle for handling the collision accident that was not previously recognized.

Finally, any one of the first-grade accident image, the second-grade accident image, and the third-grade accident image are permanently (until a user deletes the images or the storage medium is physically damaged) preserved in the storage medium of the blackbox (ST850). Furthermore, in step ST850, the first-grade accident image, the second-grade accident image, or the third-grade accident image may be moved to a region of the storage medium in which overwrite is impossible or may be immediately transmitted to a remote control server.

FIG. 9 is a diagram conceptually depicting the entire flow of a method of selecting an accident image based on speed profile analysis according to the present disclosure. The processes of the present disclosure described with reference to FIGS. 6 to 8 are described in brief with reference to FIG. 9.

After the blackbox for a vehicle stores the impact detection image at the impact detection timing T0, the method of selecting an accident image according to the present disclosure is performed. The method of selecting an accident image according to the present disclosure starts with a step in which it is determined whether the driving speed of the vehicle maintains the reference speed $V_{TH}$ or less during the reference $\Delta T_{stop}$ for the stop time in the section (T1, T2) (ST910). When the determination result of step ST910 is "Yes", the corresponding impact detection image is determined as an image having a high accident possibility. When the determination result of step ST910 is "No", the corresponding impact detection image is determined as an image having a low accident possibility.

When the corresponding impact detection image is determined as an image having a high accident possibility, the blackbox detects the deceleration ratio of the vehicle in the section (T1, T2), and determines the detected deceleration ratio by comparing the detected deceleration ratio with the ADR and the SDR (ST920). When the deceleration ratio is greater than the ADR, the corresponding impact detection image is finalized as an accident image.

When the impact detection image is finalized as the accident image, the process proceeds to step ST930 of determining a point at which the sudden deceleration section is located on the basis of T0 (ST930).

If the sudden deceleration section is located before T0, the impact detection image is determined as the first-grade accident image indicative of the highest accident possibility. Referring to FIG. 9, an accident grade of the corresponding image may be indicated as a first accident possibility indication bar 910 whose six boxes are fully filled. The blackbox includes tag information indicative of the first-grade accident image in the impact detection image, and permanently preserves the impact detection image, including the tag information, in the storage medium (ST940). The first accident grade image may be immediately transmitted to the remote control server. When a user or a manager of the control server checks the first-grade accident image, the first accident possibility indication bar 910 may be displayed with the first accident possibility indication bar 910 overlaid with the corresponding image. Furthermore, for example, text information indicative of the first-grade accident image may be displayed along with the corresponding image.

If the sudden deceleration section is located while overlapping T0, the impact detection image is determined as the second-grade accident image, and an accident possibility of the corresponding image may be indicated as a second accident possibility indication bar 920 of FIG. 9 whose five boxes are filled. When the sudden deceleration section is located after T0, the impact detection image is determined as the third-grade accident image, and an accident possibility of the corresponding image may be indicated as a third accident possibility indication bar 930.

When the deceleration ratio is confirmed as a value between the SDR and the ADR in the process ST920 of determining the deceleration ratio, the corresponding impact detection image is determined as the fourth-grade accident image, and a process ST950 of preserving the image (or transmitting the image upon request from the control server) may be subsequently performed. The fourth-grade accident image may be indicated as a fourth accident possibility indication bar 940 whose three boxes are filled. When the deceleration ratio is determined to be less than the SDR in the process ST920 of determining the deceleration ratio, the corresponding impact detection image is determined as the fifth-grade accident image. Furthermore, when the determination result of ST910 is "No", the corresponding impact detection image is determined as an image having the lowest accident possibility (the sixth-grade accident image). The fifth-grade accident image and the sixth-grade accident image may be deleted from the storage medium or moved to an overwritable region through a process of step ST960 (ST960). In FIG. 9, a fifth accident possibility indication bar 950 is an item indicative of an accident possibility of the fifth-grade accident image. A sixth accident possibility indication bar 960 is an item indicative of an accident possibility of the sixth-grade accident image.

The disclosed disclosure may be modified in various ways within a range that does not impair a basic spirit of the present disclosure. That is, all the embodiments should be interpreted as being illustrative and are not interpreted as being limitative. Accordingly, the scope of protection of the present disclosure should be determined by the accompanying claims, not the above embodiments. If a limited element in the accompanying claims is substituted with an equivalent thereto, the substitution should be construed as belonging to the scope of the protection of the present disclosure.

The invention claimed is:

1. A method of selecting an accident based on speed profile analysis, by detecting, by a blackbox installed in a vehicle, an impact applied to the vehicle, storing an image before and after impact detection timing (T0) as an impact detection image, and then determining whether the impact detection image is an accident image, the method comprising steps of:
   (a) determining whether a driving speed of the vehicle maintains a reference speed ($V_{TH}$) or less for a given time in a section between first timing (T1) before the impact detection timing (T0) and second timing (T2) after the impact detection timing (T0);
   (b) determining the impact detection image as an image having a low accident possibility when the driving speed is determined to be greater than the reference speed ($V_{TH}$) in the step (a);
   (c) determining the impact detection image as an image having a high accident possibility when the driving speed is determined to be equal to or smaller than the reference speed ($V_{TH}$) in the step (a);
   (d) detecting a deceleration ratio of the vehicle in the section between the first timing (T1) and the second timing (T2) and determining whether i) the deceleration ratio is less than a predetermined safe deceleration ratio (SDR), ii) the deceleration ratio is equal to or greater than the SDR and is equal to or smaller than an accident deceleration ratio (ADR) predetermined as a value greater than the SDR, iii) the deceleration ratio is greater than the ADR;
   (e) re-determining the impact detection image as an image having a low accident possibility again when the determination result of the step (d) indicates that i) the deceleration ratio is less than the SDR or ii) the deceleration ratio is equal to or greater than the SDR and is equal to or smaller than the ADR; and
   (f) determining the impact detection image as an accident image when the determination result of the step (d) indicates that iii) the deceleration ratio is greater than the ADR;
   (g) selecting a sudden deceleration section, in which the vehicle is decelerated most suddenly, among a plurality of division sections obtained by equally dividing the section between the first timing (T1) and the second timing (T2), and determining whether the sudden deceleration section is located i) before the impact detection timing (T0), ii) before and after the impact detection timing (T0) while overlapping the impact detection timing (T0), or iii) after the impact detection timing (T0);

(h) determining the impact detection image as a first-grade accident image indicative of the highest accident possibility when the determination result of the step (g) indicates that the sudden deceleration section is located i) before the impact detection timing (T0);

(i) determining the impact detection image as a second-grade accident image indicative of a lower accident possibility than the first-grade accident image when the determination result of the step (g) indicates that the sudden deceleration section is located ii) before and after the impact detection timing (T0) while overlapping the impact detection timing (T0); and (j) determining the impact detection image as a third-grade accident image indicative of a lower accident possibility than the second-grade accident image when the determination result of the step (g) indicates that the sudden deceleration section is located iii) after the impact detection timing (T0);

wherein when determining the impact detection image as the first-grade accident image, the second-grade accident image, or the third-grade accident image, tag information of a corresponding accident grade image is included in the impact detection image, and the impact detection image including the tag information is preserved in a storage medium within the blackbox or moved to a region incapable of being overwritten.

2. The method of claim 1, wherein in the step (a), the reference speed ($V_{TH}$) is set in a range of 0 (zero) to 5 km/h.

3. The method of claim 1, wherein when the impact detection image is determined as an image having a low accident possibility in the step (b), the impact detection image is deleted from the storage medium of the blackbox or moved to an overwritable region.

4. The method of claim 1, wherein when determining the impact detection image as the first-grade accident image, the second-grade accident image, or the third-grade accident image, the impact detection image is immediately transmitted to a remote control server.

5. The method of claim 1, wherein when the determination result of the step (d) indicates that ii) the deceleration ratio is equal to or greater than the SDR and is equal to or smaller than the ADR, the impact detection image is determined as a fourth-grade accident image indicative of a lower accident possibility than the third-grade accident image, and is temporarily preserved in a storage medium within the blackbox or moved to an overwritable region.

6. The method of claim 5, wherein when determining the impact detection image as the fourth-grade accident image, the fourth-grade accident image is transmitted to a remote control server when the remote control server requests the transmission of the fourth-grade accident image.

7. The method of claim 5, wherein when the determination result of the step (d) indicates that i) the deceleration ratio is less than the SDR, the impact detection image is determined as a fifth-grade accident image indicative of a lower accident possibility than the fourth-grade accident image, and is deleted from the storage medium or moved to an overwritable region.

8. The method of claim 7, wherein when the impact detection image is determined as an image having a low accident possibility in the step (b), the impact detection image is determined as a sixth-grade accident image indicative of a lower accident possibility than the fifth-grade accident image.

* * * * *